Patented June 3, 1941

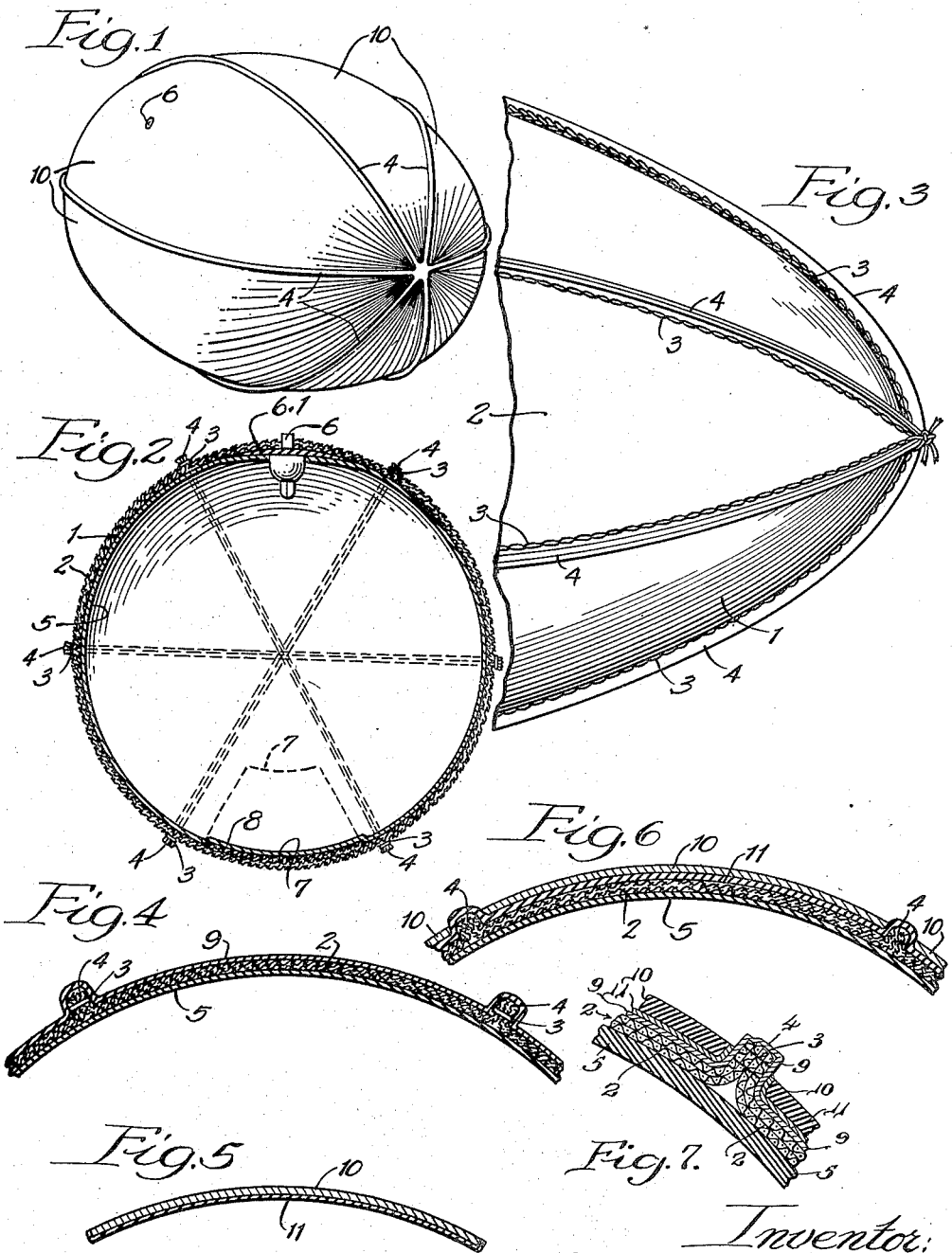

2,244,503

UNITED STATES PATENT OFFICE 2,244,503

PLAYING BALL

John T. Riddell, Chicago, Ill.

Application August 17, 1938, Serial No. 225,319

4 Claims. (Cl. 273—65)

This invention relates to playing balls of the type that is appropriate for the games of basketball, volley ball, soccer and football.

Balls of this character are preferably leather-covered and are usually reinforced with an inner carcass formed of fabric and inflated by means of a rubber bladder within the carcass.

The main objects of this invention are to provide an improved construction for inflatable playing balls, particularly those that are covered with a casing of thick leather whereby the finished ball will be provided with improved means facilitating its being gripped by the player, taking into account the fact that the diameter of balls of the type referred to are usually large compared to the span of the player's hand; to provide a leather-covered inflatable ball structure wherein the carcass is so formed as to provide outstanding ridges extending beyond the spheroidal surface of the leather covering to enable the player to grip the ball with one hand; and to provide an improved construction of this kind in which the surface texture of the ridges is such as will offer frictional resistance to the slipping of the player's fingers somewhat greater than the resistance afforded by the surface of the leather casing.

An illustrative embodiment of this invention is shown in the accompanying drawing in which:

Figure 1 is an endwise view in perspective of an elongated spheroidal ball of the type used in football games and constructed according to this invention.

Fig. 2 is a transverse section of the carcass of the ball taken on a plane at right angles to the longitudinal axis of the ball, and also showing the inflated bladder within the carcass.

Fig. 3 is a fragmentary side elevation of the carcass.

Fig. 4 is a fragmentary sectional detail of the carcass illustrating the arrangement of the latex coating that is applied to the outer surface of the carcass before applying the outer casing.

Fig. 5 is a sectional detail of a casing panel showing its inner surface and marginal edges coated with latex prior to being applied to the surface of the carcass.

Fig. 6 is a sectional detail of the finished ball.

Fig. 7 is a cross-sectional view through one of the ridge joints, substantially as shown in Fig. 6 but on a larger scale.

In the form shown in the drawing, the carcass 1 is made up of a plurality of sections 2 each made up of a plurality of layers of fabric cemented together with latex and then cut to appropriate size and contour to produce the desired spheroidal shell form when sewn together along their marginal edges and inflated.

The sections 2 of the carcass are then sewn together at their marginal edges by stitching 3, so as to provide outstanding seams 4 forming ridges of uniform height on the surface of the carcass. Before the last seam is closed, a rubber bladder 5 is inserted into the interior of the carcass with the valve nipple 6 extending through a perforation previously made in the carcass for this purpose and the bladder is cemented to the carcass in a limited circular area 6.1 around the valve nipple.

The carcass is also provided with an internal flap shown at 7 in Fig. 2. This flap is stitched at 8 along one of its longitudinal edges to the adjacent wall of the carcass and is located directly opposite the valve and serves the double purpose of counter-balancing the weight of the valve and of providing a protective flap covering a slit that may be made in this vicinity when repair of the ball at some future time makes it necessary to cut a lacing slit into the casing for the removal of the bladder.

After the carcass is completed the bladder is inflated and the carcass is stretched to its final form, preferably within a mold at pressure much higher than normal playing pressures.

Before removal from the mold the pressure within the bladder is reduced to the normal playing pressure of 13 pounds per square inch. Then the entire outer surface of the carcass is coated with a thick layer 9 of latex which is extended over and around the outstanding seams so as to completely impregnate and cover these and form solid ridges with smooth rounded crests.

The leather casing which is applied to the exterior surface of the carcass consists of a plurality of panel pieces 10 appropriately shaped to fit the respective carcass surface areas between the ridges with the edges of the panels abutting the sides of the ridges formed by the coated projecting seam margins of the carcass sections. Each leather panel portion has a coating of latex 11 covering its inner face and skived marginal edges.

The ridges 4 which are formed by the coated outstanding seams of the carcass are of sufficient height and appropriately formed to provide round crested ridges projecting a little distance beyond the outer spheroidal surface of the casing of the ball, after the latter is completed by cementing the panels 10 in place between the ridges 4.

With a football of present day standard form and dimensions, if its surface is divided by ridges into six longitudinal sectors, the ridges will be properly located to facilitate its being caught and grasped in one hand of the player with a degree of security that is of great help in avoiding fumbling and in facilitating certain plays.

Although but one specific embodiment of this invention is herein shown and described, it will be understood that details of the construction shown may be altered or omitted without departing from the spirit of the invention as defined by the following claims.

I claim:

1. An inflatable playing ball, comprising a fabric carcass made up of a plurality of body sections marginally stitched together with outstanding seams, means impregnating and covering said seams to form solid ridges, and an outer wear-resisting casing of sheet material comprising panels cemented upon and conforming to the surface areas of the carcass bounded by said ridges, the edges of said panels abutting against the sides of said ridges.

2. An inflatable playing ball, comprising a fabric carcass made up of a plurality of body sections marginally stitched together with outstanding seams, a coating of latex filling and covering said seams to form solid ridges, and an outer wear-resisting casing of sheet material comprising panels cemented upon and conforming to the surface areas of the carcass bounded by said ridges, the edges of said panels abutting against the sides of said ridges.

3. An inflatable playing ball, comprising a fabric carcass made up of sections marginally stitched together with outstanding seams forming ridges, a coating of latex covering said carcass and filling said seams whereby the said ridges are rendered firm and smooth, and wear-resisting face panels conforming to the surface areas of the carcass bounded by said ridges, each of said panels being coated on its inner side and edges with latex whereby they are securely held in place adherently, and the edges of said panels being skived to fit snugly against the sides of said ridges.

4. An inflatable playing ball, comprising a fabric carcass made up of a plurality of body sections marginally stitched together with outstanding seams, a coating consisting of a relatively thick layer of latex impregnating the fabric carcass and filling and covering said seams to prevent raveling of the fabric and to form solid ridges, and an outer wear-resisting casing of sheet material comprising panels cemented upon and conforming to the surface areas of the carcass bounded by said ridges, the edges of said panels abutting against the sides of said ridges at the base thereof and the ridges projecting beyond the outer surfaces of said panels.

JOHN T. RIDDELL.

CERTIFICATE OF CORRECTION.

Patent No. 2,244,503. June 3, 1941.

JOHN T. RIDDELL.

It is hereby certified that error appears in the printed specification of the above numbered patent requiring correction as follows: Page 2, first column, line 32, claim 2, after the syllable "com-" insert the syllable and words --prising panels cemented upon and conforming to--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.